United States Patent [19]

Schmidt

[11] Patent Number: 4,468,320
[45] Date of Patent: Aug. 28, 1984

[54] INTEGRATED FLOTATION FILTRATION PLANT

[76] Inventor: Friedrich-Karl Schmidt, St. Martins, New Brunswick, Canada, E0G 2Z0

[21] Appl. No.: 391,181

[22] Filed: Jun. 23, 1982

Related U.S. Application Data

[63] Continuation of Ser. No. 206,001, Nov. 20, 1980, abandoned.

[30] Foreign Application Priority Data

Nov. 17, 1979 [DE] Fed. Rep. of Germany ....... 2946520

[51] Int. Cl.³ .......................... B01D 33/04; C02F 1/24
[52] U.S. Cl. ..................................... 210/97; 210/138; 210/202; 210/221.2; 210/256; 210/260; 210/297
[58] Field of Search ............... 210/703, 704, 216, 217, 210/221.1, 221.2, 400–402, 783, 784, 202, 256, 260, 261, 373, 386, 387, 388, 389, 396, 407, 408, 97, 138, 297

[56] References Cited

U.S. PATENT DOCUMENTS

| 2,805,773 | 9/1957 | Mecklin et al. | 210/396 |
| 2,885,080 | 5/1959 | Goldman | 210/400 |
| 3,301,779 | 1/1967 | Kovacs | 210/221.2 |
| 3,358,834 | 12/1967 | El-Hindi | 210/401 |
| 3,433,359 | 3/1969 | Lundin et al. | 210/221.2 |
| 3,713,540 | 1/1973 | Davidson et al. | 210/402 |

OTHER PUBLICATIONS

Umwelt, No. 5, 1975, pp. 31–36, "Möglichkeiten der Flotation".
Hyde et al., "Water Clarification by Flotation", Journal AWWA, Jul., 1977, pp. 369–374.
Lundgren, "Theory and Practice of Dissolved Air Flotation", Journal of Filtration and Separation, Jan./Feb., 1976.
Associated Water and Air Resources Engineers, Inc., "Process Design Techniques for Industrial Waste Treatment", 1974, Chapter 2.
"Dissolved Air Flotation Filter", by Friederich-Karl Schmidt.
"Perfekt bis zum Recycling", Brochure of Kleindienst Aquatec GmbH & Co., and Translation.
"Drum Filter, Type TF", Brochure by M&J (Möller & Jochumsen A/S Vejlevy 3–5, 8700 Horsens, Denmark).
"Process Design Manual for Suspended Solids Removal", U.S. Environmental Protection Agency, Reprint from Chapter 7, pp. 7-17, 7-23, 7-27, 7-35, 7-40.

Primary Examiner—Ivars Cintins
Attorney, Agent, or Firm—Lee, Smith & Zickert

[57] ABSTRACT

In a flotation basin a flotation zone and a pure liquid zone are formed which are separated by filter means. A liquid containing suspended matter is introduced into the flotation zone via an inlet and subjected to pressure release flotation by saturating pure liquid with pressurized gas under a pressure in the range of 3 to 8 bar and injecting the pressurized gas saturated liquid into the flotation zone in the region of the inlet. The flotated mud accumulating at the surface of the liquid is removed laterally by removal means coacting with the filter means or is removed by means of a combined filtering and removing device together with non-flotatable suspended matter on a filter web circulated or passed through the flotation basin. The mud is predried on the filter web and separated therefrom by redirecting its run, if desired, with assistance by a scraper. The mud falls into a collecting container separated from the flotation basin or its contents by a partition. The outlet is disposed in the pure liquid zone downstream from the filter web or between the runs thereof with respect to the direction of liquid flow. The pure liquid is discharged by a pump controlled in dependence on the inflow.

33 Claims, 7 Drawing Figures

INTEGRATED FLOTATION FILTRATION PLANT

This is a continuation, of application Ser. No. 206,001, filed Nov. 20, 1980, now abandoned.

BACKGROUND OF THE INVENTION

The invention relates to an integrated flotation filtration plant comprising a flotation basin having side walls and a bottom and having an inlet for supplying a liquid containing suspended matter and an outlet through which purified liquid having a reduced content of said suspended matter is discharged, gas introducing means associated with said inlet and arranged closely above the bottom of said flotation basin to generate a flow of rising gas bubbles for flotation of said suspended matter contained in said liquid entering said flotation basin, comprising further removal means for the flotated mud thus generated and filter means disposed within said flotation basin.

The invention, also, relates to an integrated flotation and filtration process comprising the steps of supplying a liquid containing suspended matter to the inlet of a flotation basin having side walls and a bottom and an outlet, of introducting gas into said liquid while entering said basin to form a rising flow of fine bubbles interacting with said suspended matter and forming a mud floating on the surface of said liquid, of employing removal means to remove the flotated mud from the surface of said liquid, of passing said liquid through filter means to separate any non-flotatable portions of said suspended matter, and of discharging a liquid purified from said suspended matter at said outlet.

In the process of flotation suspended matter in a liquid like water is separated therefrom by generating a rising flow of finely divided gas bubbles within the body of liquid, the matter suspended therein becoming entrained thereby and being caused to float on top of the liquid. The flotated mud thus separated at the surface of the liquid may then become removed by a suitable sweeping device. Alternatively, suspended matter may be generated artificially by adding a flocculent to the liquid in a preconnected flocculation stage in which way the liquid may become purified from suspended matter more effectively. The so-called pressure release flotation has proven particularly advantageous since thereby smaller bubbles can be generated in the liquid as compared to direct gas introduction through nozzles. In the pressure release flotation a portion of the liquid free of any suspended matter may also be circulated; the liquid is saturated with pressurized gas at a pressure in the range of about 3 to 8 bar and, then, introduced in the inlet region into the liquid containing suspended matter through one or more pressure relief valves.

In the mostly rectangular flotation plants the inlet is placed regularly at the bottom of one narrow side of the flotation basin and the outlet is disposed at the opposite narrow side of the flotation basin. Upstream of the outlet removal means including a sweeping device are placed to remove the flotated mud and supply the same to further processing. In many cases deposition of sediments cannot be prevented in the flotation basin so that additional removal means must be provided therefor which convey the sediment accumulated at the bottom of the flotation basin to a channel from which the sediment can be discharged without interference with the flotation process (see Friedrich-Karl Schmidt, "Methods of Flotation", printed in UMWELT, 1975, No. 5, pages 31 to 36).

While the efficiency of known flotation plants is reasonably satisfying, the necessity to use removing apparatus for the flotated mud as well as for deposited sediment represents an undesired and great expense. Also, the known flotation plants do not achieve complete separation of the suspended matter so that in many a case the liquid discharged from the flotation plant still contains a non-negligible concentration of suspended matter. Particularly in the case of variable loads problems will result correctly dimensioning the plant if a breakthrough is to be excluded. It has also been tried to remove such problem by series connecting a filtration plant, however, the expense for the entire plant, then, will become unreasonably large (municipal sewage treatment plant, LÜtjensee, Schleswig-Holstein, Federal Republic of Germany).

Another municipal sewage treatment plant (Tangstedt, Schleswig-Holstein, Federal Republic of Germany) has become known in which filter means forming a sand filter bed are arranged in the flotation basin. Such an integrated plant has a problem in that the sand filter bed requires backflushing from time to time for purification which prevents the desired continuous operation of the integrated plant and which requires additionally treatment of the backflush water.

SUMMARY OF THE INVENTION

The problem to be solved by the invention is to provide for an integrated flotation filtration plant of the kind initially mentioned which will permit continuous operation and complete separation of suspended matter as far as possible even with varying loads.

According to the invention this problem is solved in that filter means extending at least over part of the width and part of the depth of the flotation basin to define a flotation zone and a pure liquid zone and removal means coacting therewith are provided and in that the outlet is placed downstream of said filter means with respect to the flow direction.

In accordance with the process of the invention the filter subdividing the body of liquid into a flotation zone and a pure liquid zone is passed through the liquid at an angle with respect to the flow direction and the flotated and non-flotated suspended matter is continually removed by the filter.

By means of the filter and removal means extending through and subdividing the flotation basin the liquid fed into the same as filtered in addition to being subjected to flotation so that the liquid at the outlet located downstream of said filter and removal means is collected continuously with a sufficiently reduced content of suspended matter. The integrated plant of this kind permits the filter means to be relieved by the flotation preceding filtration and, on the other hand, is less critical with respect to dimensioning because the filter means will be able to compensate for any collapse or interference occurring in the flotation without the plant becoming entirely unfunctionable or without a reduction in the quality of the pure liquid obtained at the outlet. Furthermore, the combined filter and removal means will enable continuous removal of the flotated suspended matter with the inclusion of the non-flotatable components in the suspended matter so that the plant can be operated continuously and without interruptions due to work necessary at the filter means. Thereby the mud is obtained with a higher degree of dryness than in the known plant. The integrated plant of this kind causes lower total costs and has smaller space requirements. Other advantages are gained from the filter and removal means including a circulating filter web driven continuously or discontinuously. In starting from the inlet to the flotation basin the filter web is being returned above the liquid in such a way that the mud falls off therefrom in a predried state beyond a partition. Separation of the mud from the filter may be additionally furthered by forming a zone of subatmospheric pressure above the liquid level and below the filter. Finally, the filter may be washed in a liquid washing zone subsequently.

Also, the filter web including the mud may be fed to a rolling press whereby the mud will be obtained in a substantially smaller volume and at a considerably higher degree of dryness than may be achieved in the known flotation plants.

Additionally, however also exclusively, means for generating gas bubbles to pass through the filter and for forming a release zone supplied with pressurized gas saturated liquid in conjunction with pressure release flotation equipment may be provided in the region of the flotation zone at the filter.

Separation of the mud from the filter and also the separating process in the flotation basin may be furthered additionally by at least one vibrator.

Further objects and advantages achieved by the invention will appear from the description of embodiments of the invention with reference to the accompanying drawings.

DESCRIPTION OF THE PREFERRED EMBODIMENTS

Figure 1:
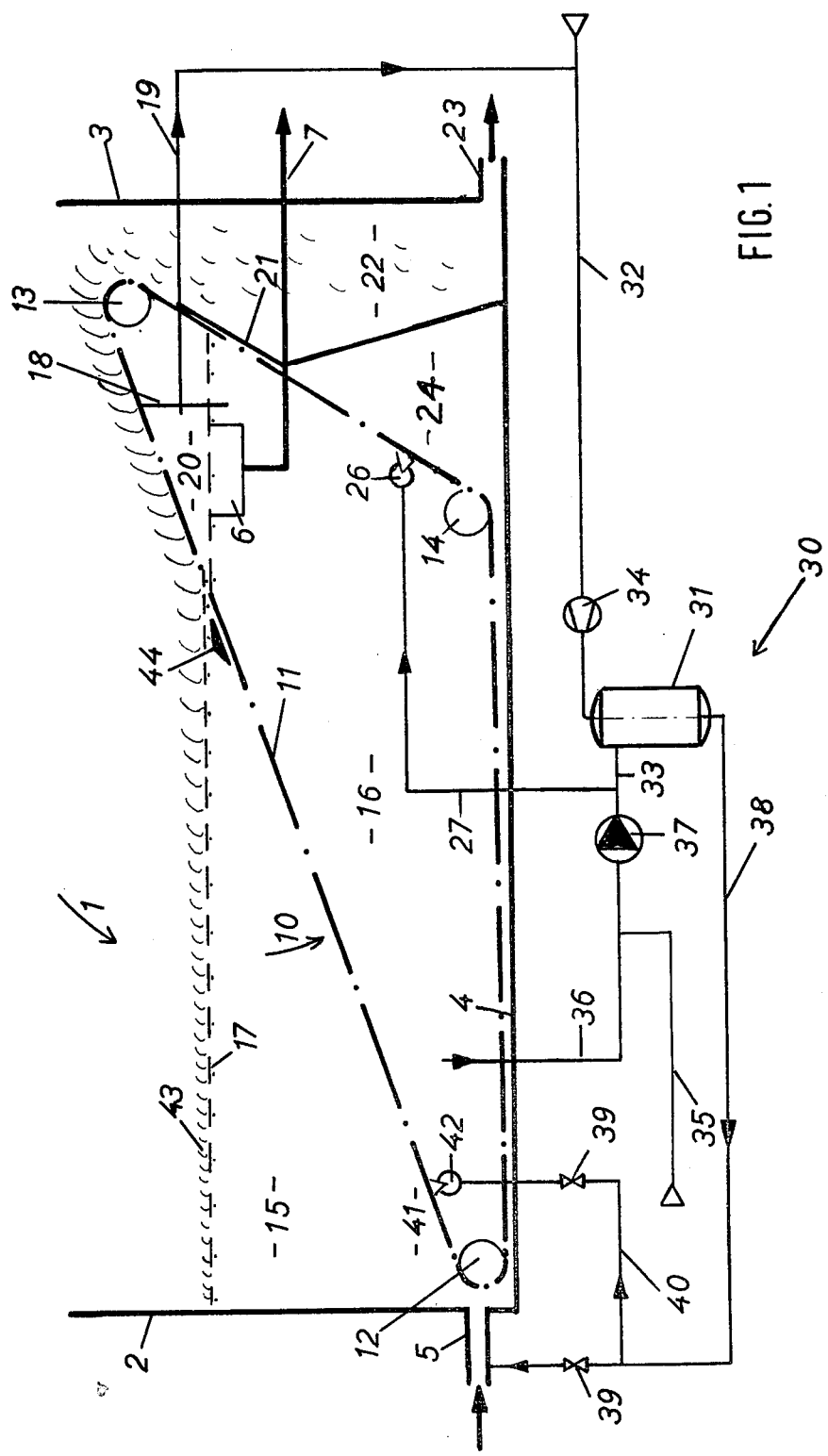
FIG. 1 is a schematic illustration in longitudinal section of a first embodiment of the integrated flotation filtration plant according to the invention.

In the drawings flotation plants employing pressure release flotation are shown; the filter and removal means shown therein are, however, not depending in their mode of operation and in their efficiency on pressure release flotation but may be utilized the same way and to the same advantages in flotation plants including other known gas introducing means.

In the flotation plants described hereinbelow a flotation zone and a pure liquid zone are defined by the filter and removal means in a flotation basin. In the most simple case which is not illustrated in a drawing a filter plate extends diagonally from the bottom of the inlet side through the flotation basin over its entire width to the outlet side, the outlet being disposed within the pure liquid zone downstream from the filter plate with respect to the flow direction. The filter plate is supported on bars at opposite side walls of the flotation basin and is readily removed and installed for cleaning and servicing purposes. Known removal means (Friedrich-Karl Schmidt, l.c.) remove the flotated mud separated on the surface of the liquid and sweeping means coacting with the filter plate are provided to take up sediment deposited on the filter plate and to feed the sediment to the removal means so that the sediment will become removed together with the flotated mud.

FIG. 1 shows the first embodiment of an integrated flotation filtration plant. The flotation basin 1 thereof has first and second narrow sides 2 and 3, respectively. At a small distance from a bottom 4 of flotation basin 1 an inlet 5 is placed at the narrow side 2 and extends over the entire narrow side 2. An outlet 6 designed with an overflow and including a pure liquid conduit 7 is located at the opposite narrow side 3 of the flotation basin 1. Outlet 6 forms a box for example from sheet metal and is open on one side thereof; the sidewalls of the box are mounted to the side walls of flotation basin 1. Eventually, the box may also be arranged for up and down displacement. The pure liquid conduit 7 extending from the bottom of outlet 6 is sealingly passed through one of the side walls of flotation basin 1 in conventional manner and is designed flexible in the case of an outlet adjustable in elevation. Instead of outlet 6 an outline line connected to the suction side of a pump may be provided for pure liquid discharge which will also be passed sealingly through one of the side walls of the flotation basin 1 in conventional manner. The pump to which the outlet line is connected will be controlled in dependence on the inflow through inlet 5.

A combined filter and removal means 10 described hereinbelow is placed in the interior of flotation basin 1. Included therein is a circulating or traveling filter web 11 guided by three rollers. A first guiding roller 12 is located close to the bottom 4 of flotation basin 1 at the narrow side 2 thereof and below inlet 5. A driving roller 13 is located close to the right-hand narrow side 3 of flotation basin 1 and a second guiding roller 14 is located again close to the bottom 4 of flotation basin 1 in its central region. Each roller 12, 13, 14 comprises a hollow shaft extending over the width of flotation basin 1, the ends of the shafts being journalled in journals located at the side walls of flotation basin 1. At their ends the hollow shafts carry sprocket wheels drivingly connected via a chain drive. Conveniently roller 13 disposed above the liquid level serves as the driving roller drivingly connected via a chain drive to an electromotor supported at the upper rim of the flotation basin 1. The chains are guided in chain guides located at the side walls of flotation basin 1. The drive motor may also be connected immediately to driving roller 13. The drive means are not shown in detail in FIG. 1 for the reason of clearness and constitute commercially available components.

The filter web 11 is made of a textile web selected in accordance with the requirements determined by the respective purpose of application. The web 11 starts from the first guiding roller 12 and extends diagonally through the flotation basin 1 towards driving roller 13 above liquid level 17 and returns therefrom via the second guiding roller 14 located at the bottom 4 of flotation basin 1 in the central region thereof. In the embodiment as shown the side edges of the slightly sagging filter web 11 rest upon the chains and thus separate the flotation zone 15 from the pure liquid zone 16 in which the outlet 6 is disposed intermediate the leading and the trailing run of the filter web 11.

In plants of smaller dimensions the filter web 11 may also be guided by stationary guiding rollers or the like; then, the filter web will be perforated along its sides, a gear wheel connected to the driving roller engaging the perforation. In plants of larger dimensions specific guiding means for the edges of the filter web 11 may be provided at the side walls of the flotation basin 1, if desired. However, to prevent too much sagging and too much strain on the filter web, perforated plates or the like may be placed under the filter web 11 which plates extend over the entire width of the filter web 11 and which are mounted to the side walls of the flotation basin.

Figure 7:
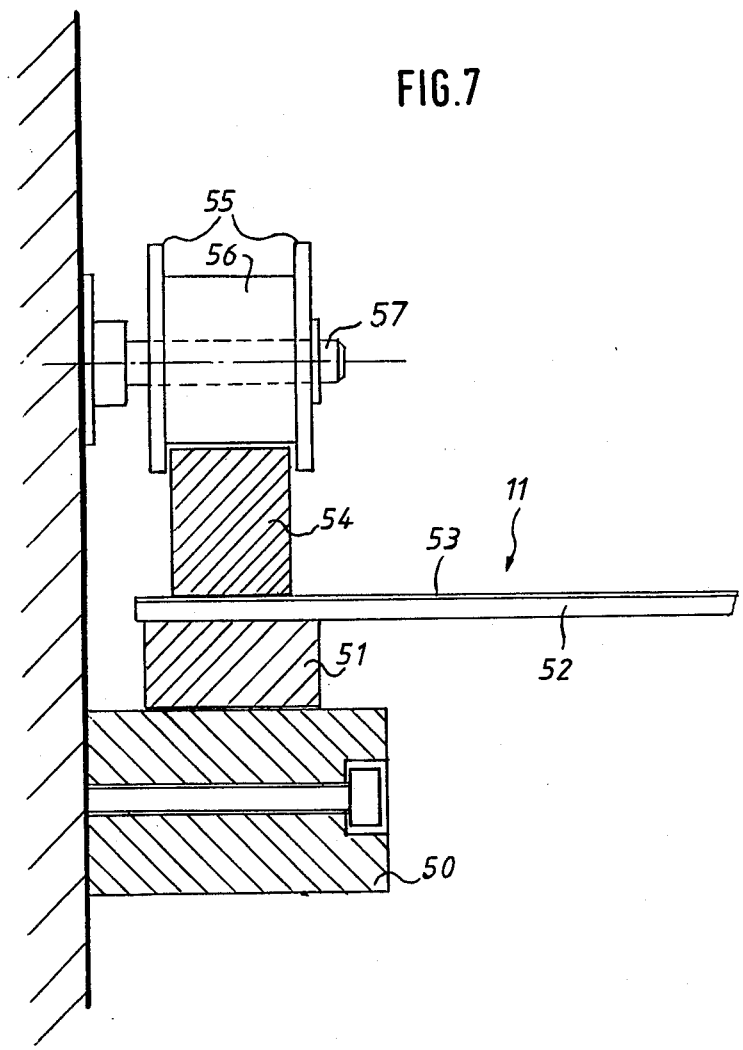
FIG. 7 is a detailed view of the filter guiding means in the embodiments as shown in FIGS. 1, 2, 4 and 5.

FIG. 7 shows in detail an example for the means for sealingly guiding the filter web 11 at the side walls of the flotation basin 1, only one of the means being illustrated for simplicity. A guide bar 50 is fixed to the side wall and extends in the running direction of the filter web 11 which rests upon the guide bar 50 by means of a sliding strip 51 which is secured to the underside of the rim of a perforated support 52 supporting filter gauze 53. Sliding strip 51 consists of a material slideable on the guide bar 50. The filter gauze 53 is provided with an elastic band 54 guided between the side pieces 55 of a pressing roller 56 journalled on a shaft 57. The shaft 57 is secured to the side wall to which a series of such pressing rollers 56 is mounted in the same way above the guide bar 50.

In the range between the liquid level 17 and the driving roller 13 arranged above therefrom a partition 18 extends, the lower rim thereof being immersed in the pure liquid and the upper rim thereof engaging the lower side of the filter web 11. The partition 18 and the filter web 11 thus define a space connected to a vacuum source through a line 19, see below. Thereby a subatmospheric pressure zone 20 is formed below the filter web 11 and above the liquid surface 17. A further partition 21 extends transversely with respect to the flotation basin 1 in the range of narrow side 3 thereof and forms a member of mud discharge means comprising a collection container 22 defined by the partition 21 together with the narrow side 3 and the corresponding portions of the side walls of flotation basin 1 and a discharge outlet 23 for the mud accumulated therein. At the top edge the partition 21 may have a scraper acting on the return run of the filter web 11.

A liquid flushing zone 24 is formed in the region intermediate the partition 21 and the return run of the filter web 11. In this region flushing means 26 forming fan-shaped jets are disposed at the inward side of the return run which jets are extending from a pipe retained at the opposing side walls of the flotation basin 1. The pipe is connected to a conduit 27 sealingly passed through one of the side walls of flotation basin 1 in conventional manner and conduit 27 is connected to a liquid supply line 33 of pressurized gas saturation means 30 to be described hereinbelow, namely to the pressure port of a pump 37.

The pressurized gas saturation means designated generally by 30 comprise a pressure vessel 31, to which pressurized gas at a predetermined pressure in the range of about 3 to 8 bar and liquid are supplied through a first supply line 32 and a second supply line 33, respectively. In this embodiment a compressor 34 is placed in the first supply line 32 and the line 19 leading from the subatmospheric pressure zone 20 is connected to the suction port of the compressor 34. The liquid supply line 33 has two branches, pure liquid being taken from a reservoir and supplied through a line 35 and being taken from the pure liquid zone 16 of flotation basin 1 and supplied through a line 36 which is sealingly passed through one of the side walls of the flotation basin 1. A pump 37 provides the pressure required to overcome the interior pressure in the pressure vessel 31. A discharge line 38 leads to the inlet 5 at the narrow side 2 of the flotation basin 1. The discharge line 38 is provided with a commerically available pressure relief valve 39 immediately upstream of its junction with the inlet 5 which comprises a collective line branching into individual inlet lines distributed over the width of the narrow side 2. A branch line 40 sealingly passed through one of the side walls of flotation basin 1 in conventional manner branches off from discharge line 38 upstream of the pressure relief valve 39 and leads to a pressure release zone 41 within the flotation basin 1. Therefor, a jet pipe 42 is provided which extends over the entire width of the filter web 11 below the leading run thereof, the jet pipe 42 being connected to the branch line 40 which includes another pressure relief valve 39.

The plant is described hereinbefore operates as follows:

The liquid saturated with pressurized gas and generated in pressure vessel 31 is admixed to the liquid containing suspended matter and entering the flotation basin 1 in the inlet 5 via pressure relief valve 39; simultaneously, circulation of the filter web 11 is started. Due to the pressure relief the gas dissolved in the liquid just under the action of pressure will be set free forming finely divided bubbles by the rising flow of which the suspended matter will be separated in the form of a flotated mud 43 on the surface of the liquid in the flotation zone 15. The flotated mud 43 is moved towards the right in FIG. 1 in the flow direction and slowly migrates towards the location at which the circulating filter web 11 leaves the surface 17 of the liquid. In this region known mud receiving and draining means (see Friedrich-Karl Schmidt, l.c.) are placed to faciliate the transfer of the flotated mud 43 to the circulating filter web 11 and simultaneous cause a first predrying of the mud. Together with the flotated mud all the other non-flotatable portions of the matter suspended in the liquid are removed since such will deposit on the filter web 11 by sedimentation. Thereby the non-flotatable matter cannot form sediments on the bottom 4 of flotation basin 1 and all non-flotatable matter will be kept off the pure liquid zone 16 by means of the filter web 11. It is thus ensured that at the outlet 6 and in the pure liquid line 7 which are disposed downstream from the filter web 11 there is always obtained the pure liquid.

On further circulation the filter web 11 passes firstly through a subatmospheric pressure zone 20 in which air is sucked through the filter by means of a compressor 34 through a conduit 19 and in which further predrying is effected. The filter web 11 is deflected by about 150 degrees at the driving roller 13 located above collective container 22 so that the predried mud will drop off the filter web 11 and is collected in container 22 from which it may be discharged through discharge 23. The returned filter web 11, then, is passed through the surface 17 of the liquid and through a flush zone 24 in which eventually present remaining mud particles are flushed out by means of flushing means 26 which are connected to the pressurized side of the liquid supply line 33 of the pressurized gas saturating means 30. The filter web 11 thus cleaned reaches again the flotation zone via guiding rollers 14, 12 in which the filter web 11 is further cleaned in the pressure relief zone 41 prior to non-flotatable components are deposited again thereon.

By means of the filter web 11 a pure liquid zone 16 is defined and protected from access of impurities, the outlet 6 being located in the pure liquid zone 16. Interferences in the flotation process particularly in the case of highly variable concentrations of suspended matter thus will not become effective even at high concentrations of suspended matter when only a main portion thereof is separated in the flotation zone 15. Additionally, ready adaptation to variations in the concentration of suspended matter can be achieved at any time by controlling the filter drive and/or the pure liquid recirculation ratio correspondingly.

Also, the collection container 22 may be displaced readily to the exterior of the narrow side 3 and the driving roller 13, also, may be disposed outside thereof. Then, the outlet 6 may also become located downstream from the return run of the filter web 11 with respect to the direction of flow. In that case it is recommended to form additionally an excess pressure zone (see FIG. 3) in the region of the subatmospheric pressure zone 20 and to provide the aforementioned scraper, too, and to dispose of flushing zone 24.

Basically the circulating filter web 11 may carry transverse bars, if desired, pocket-forming bars which extend across the width of the filter web 11 and which affect the mud removal favourably. Such transverse bars, also, will take up sediments from the bottom 4 of the flotation basin 1 and transfer the sediments to the flotation zone 15. However, the mud receiving and draining means 44 and the scraper will then have to be dispensed with or will have to become adapted thereto.

Figure 2:
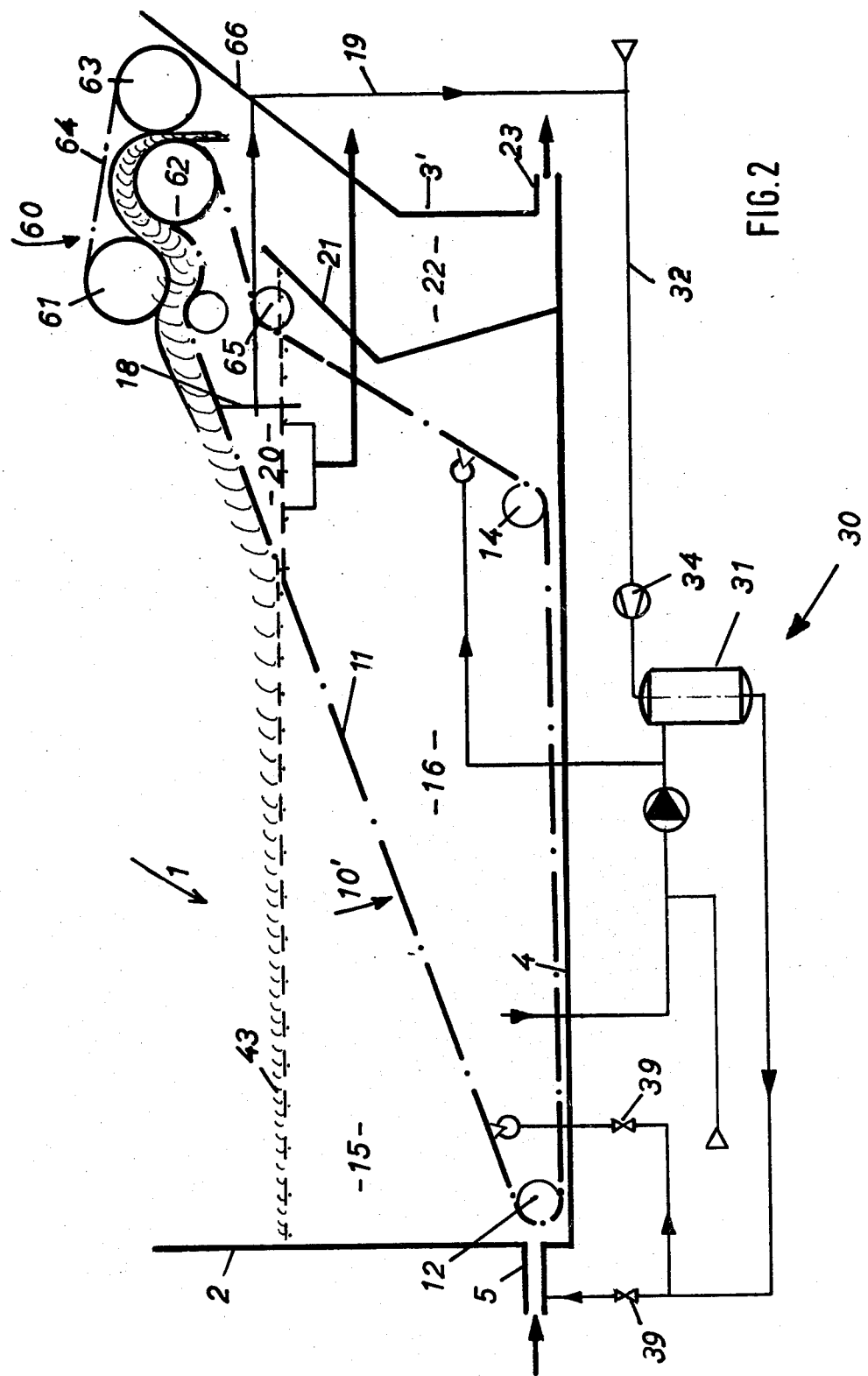
FIG. 2 is a schematic illustration in longitudinal section of a modification of the integrated flotation filtration plant as shown in FIG. 1.

The modified version of the integrated flotation filtration plant according to FIG. 1 as shown in FIG. 2 differs therefrom substantially by additional removal means forming a rolling press generally designated 60. With respect to the other members the plant is structured very similarly, however, the driving roller is selected such that the filter web 11 passes through the pressing zone under tension. Also, the mode of action of the plant is essentially the same. Corresponding members, therefore, are assigned the same reference numerals.

As in the embodiment shown in FIG. 1 the flotation basin 1 is provided with opposing narrow sides 2, 3' and with the bottom 4, with the inlet 5 and with the outlet 6, with combined filter and removal means 10', with the partition 21 and with the collection container 22 including discharge 23 and with pressurized gas saturating means 30. As shown therein, the filter web 11 subdivides the flotation basin 1 into a flotation zone 15 and a pure liquid zone 16 in which the outlet 6 is located again intermediate the leading and the returning run of the filter web 11. Above the liquid surface 17, again, a subatmospheric pressure zone 20 separated by a partition 18 is formed in this region and connected via a conduit to the suction side of a compressor 34 connected in the first supply line 32 leading to the pressure vessel 31 of pressurized gas saturation means 30.

The filter web 11 passes over the first and second guiding rollers 12, 14 and a roller 13 corresponding to driving roller 13 of the embodiment shown in FIG. 1, but not driven. After passing this roller, however, the filter web 11 is not returned immediately but passes a rolling press 60 comprising three rollers 61, 62, 63 in the most simple case. The rollers 61, 62, 63 are journalled in bearings mounted on a supporting structure which is anchored to the side walls of the flotation basin 1. The rollers are arranged in different distances from each other so that the filter web 11 is compressed with different forces in between the same. A support band 64 extends around rollers 61 and 63 and acts upon the mud on the filter web 11 running around roller 62. Thereby, further drying is effected and conventional drain means not shown are provided to drain the liquid pressed out by the action of the rollers 61, 62, 63. The filter web 11 is deflected by about 90 degrees from the vertical at the central roller 62 and, then, is returned via another guiding roller 65 towards the second guiding roller 14, passing partition 21. Below the rolling press 60 the narrow side 3' carries a chute 66 inclined downwardly towards the collection container 22. During the passage of the filter web 11 through the rolling press 60 the higher dried mud cake becomes disengaged from the filter web 11 when the same is redirected at the central roller 62 and drops on chute 66 and into collection container 22 therefrom.

In the integrated flotation filtration plants shown in FIGS. 1 and 2 the filter means extend through the entire flotation basin 1. Instead thereof, an immersion type filter apparatus may be used comprising a frame around which a filter web is circulated. One end of the frame is mounted to the narrow side 3 of the flotation basin 1 and the other end is immersed into the interior of the flotation basin 1, if desired at an adjustable angle. The pure liquid zone, then, is defined by the frame of the immersion type filter apparatus within which one or more chambers are formed intermediate the circulating runs of the filter web which chambers open to the interior faces of the filter web runs. The chambers are connected to a pump via a pure liquid line. Immersion type filter apparatus of this kind is well known and therefore not described in detail herein, see U.S. Pat. No. 3,347,378.

Figure 3:
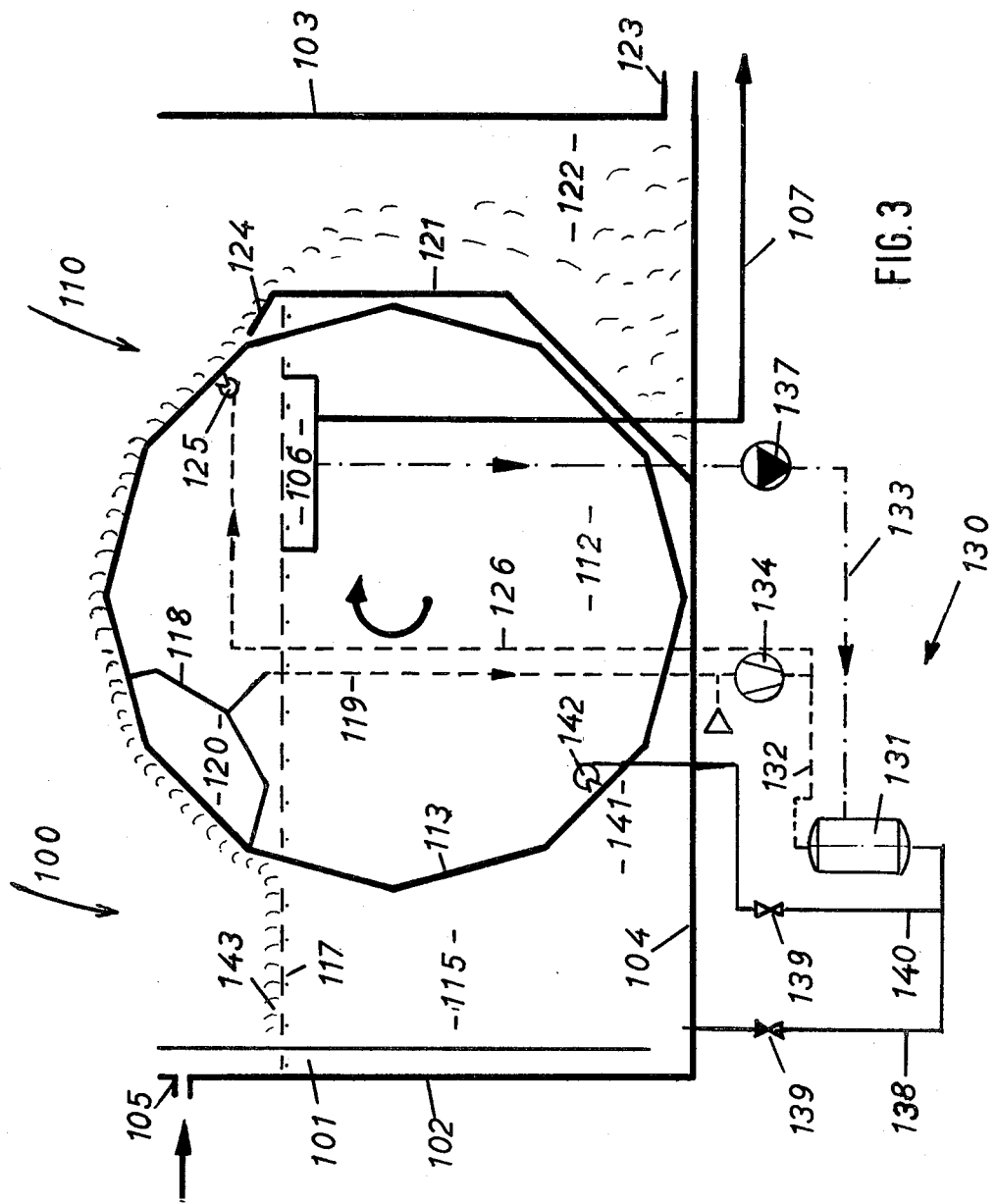
FIG. 3 is a schematic illustration in longitudinal section of a second embodiment of the integrated flotation filtration plant according to the invention.

In FIG. 3 a second embodiment of the integrated flotation filtration plant is illustrated. The flotation basin 100 has a first narrow side 102, a second narrow side 103 and a bottom 104. An inlet 105 is provided at the upper rim of the first narrow side 102 and opens into a distributor passage 101 extending across the width of the narrow side 102 and terminating closely above the bottom 104. An outlet 106 including an overflow is connected to a pure liquid line 107. If desired, the pure liquid line 107 may be connected to the suction side of a pump controlled as a function of the inflow and the outlet 106 may then be disposed of.

Combined filter and removal means 110 are located within the flotation basin 100. The combined filter and removal means 110 include a filter 111 disposed around the circumference of a filter drum 112 which extends close to the bottom 104 of the flotation basin 100 and which has a diameter greater than the filling level of the flotation basin 100. The front faces of the filter drum 112 are journalled to a stationary hollow shaft not shown and the filter drum is driven via a sprocket wheel drivingly connected to an electromotor support at the upper rim of the flotation basin 1 as in the other embodiments. The conduits leading into the interior of the filter drum 112 extend through the hollow shaft. Instead, the filter drum may be retained in a framework sealingly inserted into the flotation basin 100 and may have one open front end through which the conduits sealingly passed through the adjacent side wall in conventional manner are introduced into the interior of the filter drum. The driving means, then, will interact with respective members formed at the circumference of the filter drum. For reasons of clarity the driving means which consist of commercially available components are not shown in detail in FIG. 3; in any case, the filter drum 112 will rotate in the direction of flow through the flotation basin 100.

The filter 111 may be designed in the most different ways; in FIG. 3 the filter drum 112 forms a polygon in section, the filter 111 being composed of perforated plates 113 disposed around the circumference of the filter drum 112 and supported at a frame (not shown) on the hollow shaft of the filter drum 112. Also, the perforated plates 113 may be covered by a filter web extended around the filter drum 112. The filter drum may be formed cylindrically, too, and include a perforated cylinder face around which a filter web may also be extended. In the most simple case and with sufficiently small dimensions requiring no particular support the filter web may even be extended around the frame supported at the hollow shaft. The filter 111 is selected in correspondence to the requirements defined by the respective purpose of application. Also in this case a flotation zone 115 is separated from a pure liquid zone formed in the interior of filter drum 112, the outlet 106 being located therein.

A case 118 mounted to the side walls of the flotation basin 100 extends through the interior of the filter drum 112 above the liquid level 117, said case sealingly engaging the perforated plates 113 from below by means of rubber-elastic lips and being connected to a vacuum source via a conduit 119. Thereby a subatmospheric pressure zone 120 is formed in the region of the case 118 below the filter 111. On the opposite side of the space in the interior of the filter drum 112 an excess pressure zone not designated in detail is formed above the liquid level 117. Within this zone fan-shaped jets 125 are disposed below the filter 111 and connected via a collective line to a pressure source not shown.

In the region of the narrow side 103 a partition 121 forming a member of mud discharge means extends transversely through the flotation basin 100 and thereby together with the narrow side 103 and the corresponding portions of the side walls of the flotation basin 100 forms a collection container 122 including a discharge outlet for the mud accumulated therein. At its upper edge partition 121 carries a scraper 124 engaging the filter 111 at an acute angle. The scraper 124 comprises substantially a scraping blade formed from an elastic material acting on the surface of the filter 111 to thus support the separation of mud therefrom. The disengaged mud is deflected into the collection container 122 by means of the inclined surface formed by the scraper 124.

A liquid flushing zone may also be provided in this embodiment of the integrated flotation filtration plant.

Pressurized gas saturation means generally designated 130 comprise a pressure vessel 131 which is supplied with pressurized gas under a predetermined pressure in the range of about 3 to 8 bar through a first supply line 132 or 119 and with liquid through a second supply line 133. A compressor 134 is connected in the first supply line 132 and the line 119 leading to the subatmospheric pressure zone 120 is connected to the suction side of the compressor. In this embodiment the liquid supply line 133 is connected in parallel to the pure liquid line 107 connected to the outlet 106 with a pump 137 connected in the line 133 to introduce pure liquid into the pressure vessel 131 against the pressure prevailing in the interior thereof. A discharge line 138 leads from the pressure vessel 131 by means of which liquid saturated with pressurized gas is fed via one or more inlets each including a pressure relief valve 139 to the flotation zone 115 in the range of the outlet of the distributing passage 101 close to the bottom 104 of the flotation basin 100. A branch line 140 branches off upstream of the pressure relief valves 139 and leads to a pressure release zone 141. Therefor, a jet 142 extending over the width of the filter 111 is provided and connected to the branch line 140 via another pressure relief valve 139.

The plant described hereinbefore operates as follows:

The pressurized gas saturated liquid generated in pressure vessel 131 is introduced into the flotation zone via pressure relief valves 139, the liquid containing suspended matter being introduced via the inlet 105 and the distributor passage 101; simultaneously the filter drum 112 is set in rotation. The gas dissolved in the liquid only under pressure is liberated by the pressure release to form finely divided bubbles rising through the liquid which separate the suspended matter in the flotation zone 115 to form a flotated mud 143 on the liquid surface 177. The flotated mud 143 is entrained in the liquid flow directed towards the right in FIG. 3 and migrates slowly towards the location at which the circulating filter 111 leaves the liquid surface 117. Together with the flotated mud 143 also all the other non-flotatable portions of the matter suspended in the liquid are removed from the same because such will be deposited on the circulating filter 111 by sedimentation. Thereby the material will be kept off the pure liquid zone formed in the interior of the filter drum 112. Therefore, pure liquid is obtained always at the outlet 106 and in the pure liquid line 107 disposed downstream from the filter 111 with respect to the flow direction.

During further rotation of the filter 111 firstly the subatmospheric pressure zone 120 is passed in which air is sucked through the filter 111 by means of the compressor 134 through the line 119 to effect predrying. An excess pressure zone facilitating disengagement of the mud from the filter 111 is generated by a flow of pressurized gas which exits from fan-shaped jets 125 and which is directed towards the filter 111. By means of the scraper 124 located above the collection container 122 the predried mud is directed from the filter 111 into the collection container 122 and may be withdrawn through discharge outlet 123. The filter 111, then, re-enters through the liquid surface 117 and on re-entering the flotation zone 115 passes a pressure release zone 141 which additionally effects further cleaning of the filter 111.

In this embodiment the filter 111 defines a pure liquid zone, too, protected from the access of impurities and located within the interior of the filter drum 112 where the outlet 106 is also disposed. Interferences in the flotation process, particularly in the case of highly variable concentrations of the suspended matter, do not become effective even at high concentrations of suspended matter when only the main portion thereof will become separated in the flotation zone 115. Furthermore, ready adaptation to varying concentrations of suspended matter is achieved at any time by controlling the drive of the filter drum 112 and/or the feed ratio through the inlet 105 and the discharge lines 138, 140.

Also in this case the collection container 122 may be displaced to the exterior of the narrow side 103 and the scraper 124 directed thereto. The outlet 106, then, may be placed downstream from the return run of the filter 111 with respect to the flow direction.

On principle, the circulating filter 111 may carry transverse bars, if desired, pocket-shaped bars which extend across the width of the filter 111 and favourably affect removal of the mud. The transverse bars will also take up sediment from the bottom 104 of the flotation basin 100 and transfer the sediments to the flotation zone 115. The scraper 124, however, will then have to be removed from the upper rim of partition 121 or modified correspondingly.

The filter drum 112 may also be combined with a rolling press as in the modified embodiment of the integrated flotation filtration plant shown in FIG. 2 in case that a suitable filter web is extended around the filter drum 112 and passed through the rolling press.

Also, a mud receiving and draining device of the kind as mentioned with reference to FIG. 1 may be arranged upstream of the filter 111 in the embodiment described with reference to FIG. 3.

The integrated flotation filtration plants described hereinbefore comprise a circulating filter and a flotation zone located outside thereof and a pure liquid zone enclosed by the filter. Plants of this type with an interchanged zone arrangement are described hereinbelow.

Figure 4:
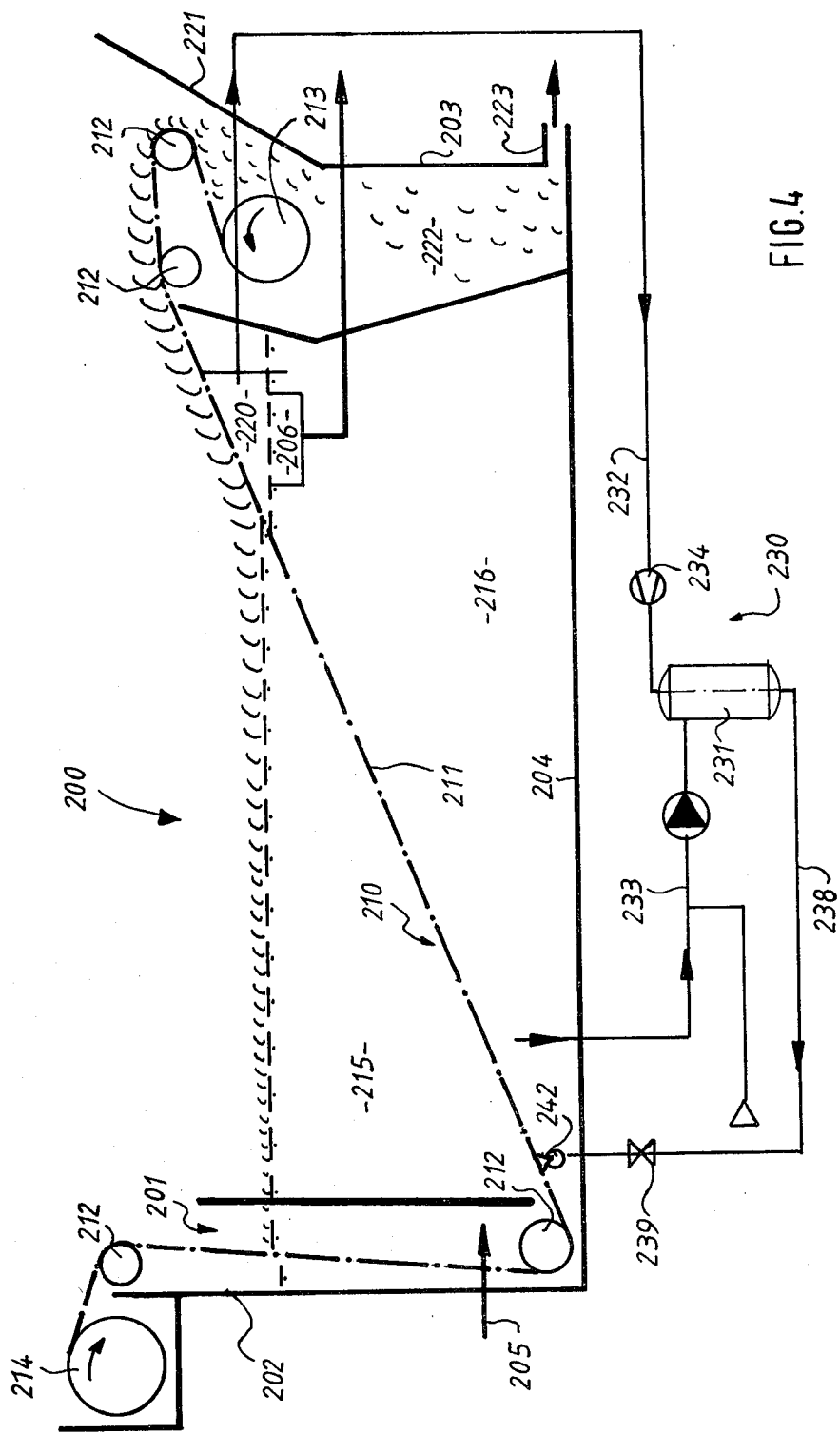
FIG. 4 is a schematic illustration in longitudinal section of a third embodiment of the integrated flotation filtration plant according to the invention.

The third embodiment of the integrated flotation filtration plant illustrated in FIG. 4 is similar to the one shown in FIG. 1 and comprises a flotation basin 200 including opposing narrow sides 202, 203 and a bottom 204, an inlet 205 and an outlet 206, combined filter and removal means 210, a partition 221 and a collection container 222 including a discharge outlet 223, and pressurized gas saturation means 230. Additionally the flotation basin 200 comprises a weir close to the narrow side 202 separating a distributor passage 201 for the introduction of the liquid containing suspended matter from the flotation zone 215, similarly to the embodiment described with reference to FIG. 3. In this particular embodiment the inlet 205 opens laterally into the distributor passage 201.

The combined filter and removal means shown in FIG. 4 include a filter web 211 passed through the liquid and withdrawn from a supply roller 214 to a take-up roller 213 via first, second, third and fourth guiding rollers 212. The second guiding roller 212 is located close to the bottom 204 of the distributor passage 201, the inlet 205 opens into the region of the distributor passage 201 which is located intermediate the filter web 211 and the weir. The filter web 221 runs diagonally through the flotation basin 200 towards the other narrow side 203 and reaches the driven take-up roller 213 via the third and fourth guiding rollers 212. The latter are placed above the liquid surface and above the collection container 222, the take-up roller 213 being set back from the fourth guiding roller 212 so that most of the flotated mud will become disengaged from the filter web 211 on deflection at this guiding roller and drops into the collection container 222. The disengagement is furthered by a subatmospheric pressure zone 220, see the embodiment as shown in FIG. 1. Like in that case the rollers 212 to 214 are journalled at the side walls of the flotation basin 201 and the filter web 211 is sealingly guided at its side edges like the filter web 11. The filter web 211 is made of a material designed to be used only once but sufficing the strains acting thereupon. The supply roller 241 and the take-up roller 213 are replaced after the filter web 211 has been wound off the supply roller 214.

The pressurized gas saturation means 230 comprise a pressure vessel 231, a first supply line 232 connected to a subatmospheric pressure zone 220 via a compressor 234 for supplying pressurized gas at a pressure of 3 to 8 bar and a second supply line 233 connected, on the one hand, to a pure liquid reservoir and to the pure liquid zone 216, on the other hand. A discharge line 238 is sealingly passed through one side wall of the flotation basin 200 and connected to a jet pipe 242 engaging the filter web 211 from below. A pressure relief valve 239 is placed into discharge line 238. In this embodiment, therefore, the pressurized gas saturated medium is not introduced into the liquid burdened with suspended matter at the inlet 205 but immediately downstream from the outlet of distributor passage 201 in the location where the liquid flows past the air, i.e. where the liquid enters the flotation zone 215.

Figure 5:
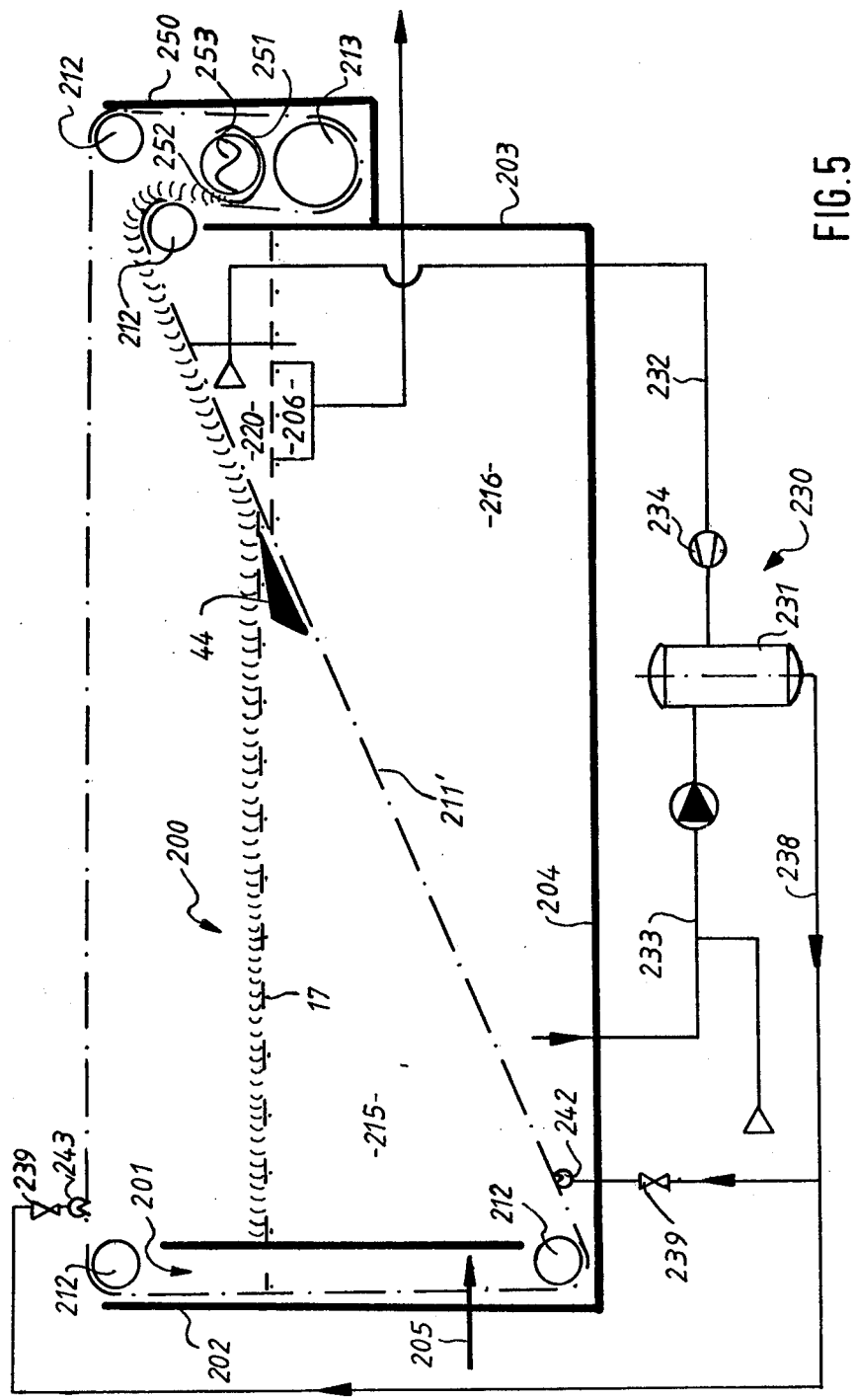
FIG. 5 is a schematic illustration in longitudinal section of a variant of the integrated flotation filtration plant as shown in FIG. 4 corresponding to the embodiment shown in FIG. 1.

FIG. 5 shows a modification of the FIG. 4 embodiment, the modification including a circulating filter web 211'. The flotation basin 200 is designed substantially as in FIG. 4. The circulating filter web 211' is driven by means of a driving roller 213 and runs around four guiding rollers 212. Two guiding rollers 212 guide the filter web 211' to pass the distributor passage 201 separated from the flotation zone 215 by the weir. Via a third guiding roller 212 the filter web 211' after being passed diagonally through the flotation basin 200 is fed to the driving roller 213 to run therefrom via a fourth guiding roller 212 in return to the distributor passage 201 overhead of the flotation basin 200. The transfer of the flotated mud to the filter web 211' at the location where the same passes through the liquid surface 17 is facilitated by mud receiving and draining means 44.

The driven roller 213 and the guiding rollers 212 associated therewith are disposed in a housing 250 located at the narrow side 203 of the flotation basin 200. A channel 251 extending through the housing 250 is placed in a leading position with respect to the driving roller 213 in running direction of the filter web 211' and carries a scraper 252 of the kind of scraper 124 shown in the FIG. 3 embodiment which scraper 252 faces the side of filter web 211' loaded with mud. A screw conveyor 253 rotates within channel 251 to discharge the flotated mud disengaged from the circulating filter web 211'. For further cleaning of the filter web 211' a jet pipe 243 engaging the filter web 211' at its exterior side is placed in a leading position with respect to the guiding roller 212 guiding the filter web towards the distributor passage 201, which jet pipe 243 is designed like the jet pipe 242 and connected in parallel thereto to the discharge line 238 extending from the pressure vessel 231 and also including a pressure relief valve 239.

In respect of the other members the integrated flotation filtration plants illustrated in FIGS. 3 and 4 are constituted analogously to the embodiment described with reference to FIG. 1 and operate correspondingly. Like the one shown in FIG. 1 also the embodiments according to FIGS. 3 and 4 may be combined with a rolling press corresponding to the rolling press discussed with reference to FIG. 2, if desired.

Figure 6:
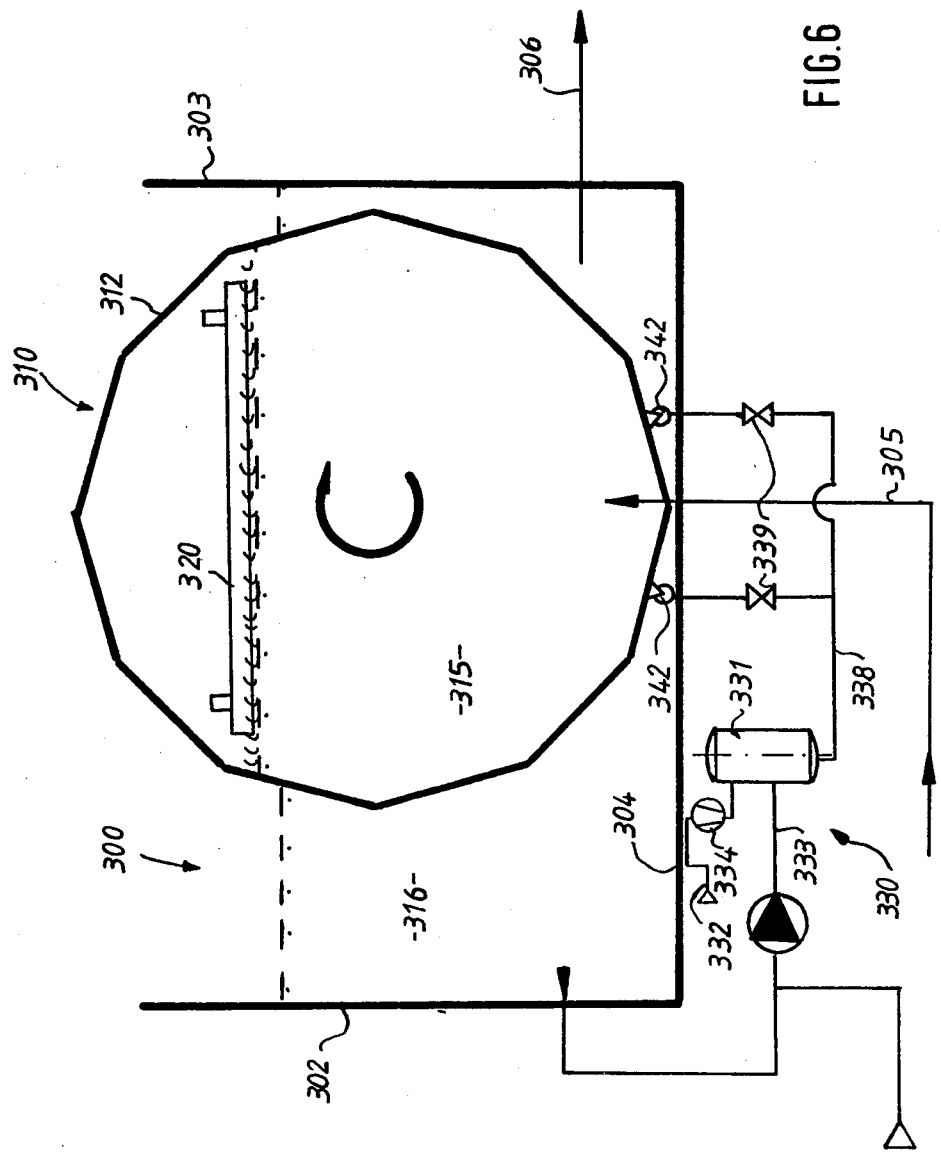
FIG. 6 is a schematic illustration in longitudinal section of a fourth embodiment of the integrated flotation filtration plant according to the invention.

FIG. 6 shows a fourth embodiment designed in analogy to the embodiment described with reference to FIG. 3. A flotation basin 300 is provided with narrow sides 302, 303 and a bottom 304, with an inlet 305 and an outlet 306, with filter means 310 and removal means 320 coacting therewith as well as with pressurized gas saturation means 330. Filter means 310 in correspondence to filter means 110 comprise a filter drum 312 having one open front face and rotating within flotation basin 300. The inlet 305 opens into the interior of the filter drum 312. The removal means 320 are placed into the interior of the filter drum 312 and serve to sidewardly remove the flotated mud accumulated on the liquid surface from the flotation basin 300. Removal means of this type are known (see Friedrich-Karl Schmidt, l.c.) and are, therefore, not described in detail here.

Pressurized gas saturation means generally designated 330 comprise a pressure vessel 331, a first supply line 332 including a compressor 334 for supplying pressurized gas at a pressure of 3 to 8 bar and a second supply line 333 for supplying liquid taken from a pure liquid reservoir, on the one hand, and from the pure liquid zone 316 located outside of the filter drum 312, on the other hand. A discharge line 338 is sealingly passed through one side wall of the flotation basin 300; it is connected to jet pipes 342 via pressure relief valves 339, the jet pipes 342 being secured to the side walls and engaging the filter drum 312 from below on both sides of the inlet 305.

In this arrangement, too, the flotation zone 315 is located in the interior of the filter drum 312 and is separated from the pure liquid zone 316 located outside thereof by the filter means 310. As in the FIG. 5 modification in this case, also, one or more jet pipes may be provided, if desired, engaging the filter drum 312 on its outer side above the liquid level like the jet pipe 243 described with reference to FIG. 5 and connected to discharge line 338 in parallel to the jet pipes 342.

It is expedient to control the driving motor in the integrated flotation filtration plants described hereinbefore in accordance with the respective requirements. Therefor a temporal control may be provided by means of which the driving rollers 13, 213 or the filter drums 112, 312, respectively, are set in motion only for selected time periods at predetermined time intervals. Such temporal controls are known (time relais including synchron motor, types AA 7610.21, AA 70011; manufactured by Dold und Söhne KG, 7743 Furtwangen, Federal Republic of Germany) and, therefore, do not require detailed description here. In the place of controls of this kind continuous circulation including circulation rate control via gear means adjustable for different gear ratios or via continuously adjustable gear means may be provided.

The rotation of driving rollers 13, 213 or filter drums 112, 312, respectively, may also be controlled as a function of the difference in liquid levels established on the two sides of the respective filter means. The means required therefor are known (non-contacting liquid level meters including difference storage and contact maker; sensor DU 210 and adaptor tube TSP 0845, silometer FMU 2180, contact maker HTA 182; manufactured by Endress und Hauser, 7867 Maulburg, Federal Republic of Germany) and thus do not require any further description here.

The plants described hereinbefore may also be equipped with at least one vibrator expediently acting on the filter web 11, 211, 211' or filter 111, respectively. Thereby the separation process of the liquid from the mud deposited on the filter is assisted and simultaneously plugging of the filter is prevented. The cleaning process of the filter is also assisted by the action of a vibrator. Finally the floating processes occurring within the flotation zones 15, 115, 215 or 315, respectively, are furthered by the vibrations imparted to the liquid.

In the plants as described above further processing of the flotated mud is very much facilitated because the mud is obtained already in a predried state without any extra efforts and thus in substantially smaller volumes as compared to conventional plants.

The integrated flotation filtration plants described hereinbefore may be utilized for the processing of water or waste water, for the recovery of suspended materials, but also for separating oil or fat-like material from aqueous liquids. In such cases the material comprising the filter means will be selected in adaptation to the respective purpose of use and in the most simple case air will be used as the flotation gas.

I claim:

1. In an integrated flotation filtration plant including a flotation basin having side walls, a bottom, an inlet for supplying a liquid containing suspended matter, a flotation zone communicating with said inlet and including gas introducing means arranged proximate the bottom of said basin to generate a flow of rising gas bubbles adapted to adhere to and to flotate at least part of the matter suspended in said liquid introduced into said basin at said inlet, removal means for removing flotated mud from the surface of the body of said liquid, filter means extending over at least part of the length and depth of said basin through said liquid downstream of said flotation zone to define a flotation zone and a pure liquid zone, and an outlet located downstream of said filter means and provided for the discharge of purified liquid having a reduced content of said suspended matter, the improvement comprising;
a gas introducing device located in the region of the inlet including means to generate microdispersed gas bubbles within the volume of liquid entering the basin through said inlet, and said filter means comprising a traveling web-type filter means having a filtered surface extending substantially the depth of said basin and including a portion passing through the surface of the body of liquid, which filter means is arranged and adapted to co-act with the removal means so as to continuously remove non-flotable suspended matter as well as surface accumulated flotated mud from the body of liquid passing through said basin.

2. Integrated flotation filtration plant according to claim 1 in which said filter means extends into the space above the liquid level established in the flotation basin, and further including means for driving said filter means along the interface between said flotation zone and said pure liquid zone.

3. Integrated flotation filtration plant according to claim 2 in which the filter means includes a rolling press disposed in the space above the liquid level.

4. Integrated flotation filtration plant according to claim 2 including a subatmospheric pressure zone extending above the liquid level and below the filter means across the width of the same.

5. Integrated flotation filtration plant according to claim 2 including an excess pressure zone extending above the liquid level and below the filter means across the width of the same and preceding the location of re-entry of said filter means into the liquid.

6. Integrated flotation filtration plant according to claim 2 including a liquid flush zone for the filter means formed in the region of the return run of said filter.

7. Integrated flotation filtration plant according to claim 6 in which the liquid flush zone is formed within the region of the flotation zone.

8. Integrated flotation filtration plant according to claim 1 in which said filter means includes a filter withdrawn from a supply, passed through the flotation basin and passed over at least one guiding means.

9. Integrated flotation filtration plant according to claim 8 in which the filter is guided over at least two rollers of which at least one is placed proximate the bottom of the flotation basin.

10. Integrated flotation filtration plant according to claim 9 in which said filter means comprises an immersion type filter secured to the flotation basin at one of its ends and immersed into the liquid contained therein, and including at least one chamber formed in between the runs of the filter, said chamber defining the pure liquid zone and including means connecting said chamber to a vacuum source.

11. Integrated flotation filtration plant according to claims 9 in which said filter comprises a continuous filter web extending diagonally through the flotation basin from a first guiding roller placed closely above the bottom of said flotation basin near the region of the entry of the liquid containing suspended matter to a driven roller disposed above the liquid level at the opposite side of said flotation basin and from said driven roller via a second guiding roller back to said first guiding roller.

12. Integrated flotation filtration plant according to claim 11 in which said web is sealingly guided along opposing edges at guide means provided at the opposing side walls at the flotation basin.

13. Integrated flotation filtration plant according to claim 11 in which said outlet is located downstream from the filter means with respect to the direction of flow.

14. Integrated flotation filtration plant according to claim 13 in which said filter means includes mud discharge means comprising a collection container separated from the pure liquid zone by a partition disposed downstream from the outlet with respect to the direction of flow.

15. Integrated flotation filtration plant according to claim 14 including at least one roller located beyond the partition and in which the filter is deflected by an angle of more than 90 degrees at said roller.

16. Integrated flotation filtration plant according to claim 9 in which the mud discharge means includes a scraper acting upon the filter means.

17. Integrated flotation filtration plant according to claim 8 or 9 in which the filter means includes transverse bars extending across the width of said filter means, said bars being spaced from each other with respect to the running direction.

18. Integrated flotation filtration plant according to claim 1 in which said filter means includes a circulating filter passed around at least one roller.

19. Integrated flotation filtration plant according to claim 18 in which said roller forms a filter drum arranged to rotate about its axis in the flotation basin and protruding partially above the level of liquid therein, said filter drum including a filter disposed at the circumferential surface thereof.

20. Integrated flotation filtration plant according to claim 19 in which the flotation zone is formed within the interior of the filter drum and in which said removal means is movable within the filter drum parallel with respect to its axis.

21. Integrated flotation filtration plant according to claim 11 or 19 in which said outlet is located within the filter means.

22. Integrated flotation filtration plant according to claim 21 in which said filter means includes mud discharge means comprising a collection container separated from the pure liquid zone by a partition disposed downstream from the outlet with respect to the direction of flow.

23. Integrated flotation plant according to claims 22 including at least one roller located beyond the partition and in which the filter is deflected by an angle of more than 90 degrees at said roller.

24. Integrated flotation filtration plant according to claim 22 in which the mud discharge means includes a scraper acting upon the filter means.

25. Integrated flotation filtration plant according to claim 11 including mud receiving and draining means located upstream of the filter means with respect to the direction of flow.

26. Integrated flotation filtration plant according to claim 1 including at least one vibrator acting upon the filter means.

27. Integrated flotation filtration plant according to claim 1 including drive means comprising a temporal control for advancing the filter means for predetermined periods of time at predetermined time intervals.

28. Integrated flotation filtration plant according to claim 27 in which the drive means comprises a drive operating at a controllable rate.

29. Integrated flotation filtration plant accordding to claim 27 or claim 28 in which the drive means is adapted to be controlled by the liquid level at the filter means.

30. Integrated flotation filtration plant according to claim 1 including pressure release flotation means including pressurized gas saturation means for saturating a liquid with gas under pressure, a supply line for supplying pure liquid, and a discharge line having an interconnected pressure relief valve for discharging pressurized gas saturated liquid said discharge line opening into the inlet or downstream therefrom into the flotation basin and said supply line being connected to the pure liquid zone.

31. Integrated flotation filtration plant according to claim 30 including a jet pipe connected to the discharge line of the pressurized gas saturation means and being disposed downstream from the filter means with respect to the direct of flow, said jet pipe being directed toward said filter means.

32. Integrated flotation filtration plant according to claim 31 including a pressure release zone formed within the flotation zone in the region of the jet pipe.

33. Integrated flotation filtration plant according to claim 1 including purifying jets located in the pure liquid zone and directed toward the flotation zone through said filter means.

* * * * *